United States Patent [19]

Ludwig

[11] Patent Number: 5,207,528
[45] Date of Patent: May 4, 1993

[54] RETAINING DEVICE FOR AN ANGLED DRIVE

[75] Inventor: Manfred Ludwig, Stuttgart, Fed. Rep. of Germany

[73] Assignee: C. & E. Fein GmbH & Co., Stuttgart, Fed. Rep. of Germany

[21] Appl. No.: 869,314

[22] Filed: Apr. 15, 1992

[30] Foreign Application Priority Data

Apr. 29, 1991 [DE] Fed. Rep. of Germany ....... 4113951

[51] Int. Cl.$^5$ .............................................. B25G 3/18
[52] U.S. Cl. .................................... 403/325; 403/322; 403/318
[58] Field of Search ............... 81/57.29; 403/322, 325, 403/84, 318, 93

[56] References Cited

U.S. PATENT DOCUMENTS

| | | | |
|---|---|---|---|
| 2,501,581 | 3/1950 | Rieger | 403/93 X |
| 2,771,647 | 11/1956 | Hemstreet | 403/322 X |
| 3,180,435 | 4/1965 | McHenry et al. | |
| 3,789,706 | 2/1974 | Smith | 81/57.29 |
| 4,463,632 | 8/1984 | Parke | 403/93 X |
| 4,842,815 | 6/1989 | Cauquelin et al. | 403/325 X |

FOREIGN PATENT DOCUMENTS 3243115 11/1982 Fed. Rep. of Germany .
3344600 12/1983 Fed. Rep. of Germany .

*Primary Examiner*—Andrew V. Kundrat
*Attorney, Agent, or Firm*—Barry R. Lipsitz

[57] ABSTRACT

The invention concerns a retaining device for an angled head (10, 11) that is driven by a drive (1) especially a drilling gun, in which the drive unit (1) has a receiving connector (2) to receive the angled head (10, 11). To allow adjustment of the angular position of the angled head with respect to the drive unit, a socket (31) that can be screwed onto threads (33) of the receiving connector (2) is provided to receive the angled head (10, 11). Pins (21) which can be displaced axially in order to retain or release balls (25) are provided in the socket (31). The receiving connector (2) has on its outer surface a plurality of lengthwise grooves (29) in which the balls are held (25). When the pins (21) are displaced axially the balls (25) are released, so that the socket (31) can rotate relative to the receiving connector (2) until the balls (25) engage in corresponding lengthwise grooves (29) and are retained by the pins.

13 Claims, 2 Drawing Sheets

RETAINING DEVICE FOR AN ANGLED DRIVE

The invention is related towards a retaining device for an angled drive that is releasably connected to a drive unit.

For many years, rod-shaped or pistol-shaped drive units, into whose drive connectors can be inserted nuts for direct screw-driving or angular drives suitable for poorly accessible screw connections, have been in common use for power screwdriving. In place of screwdriver inserts, it is of course also possible to insert other inserts, such as drill bits or the like, into the drive connector.

With rod-shaped drive units, the angular position of an angled drive relative to the drive unit plays only a subordinate role, since the drive unit can be rotated as desired. On the other hand, especially when a pistol-shaped drive unit is used, the angular position of the angled drive relative to the drive unit is of particular importance in allowing an optimum working position on poorly accessible parts.

From U.S. Pat. No. 3,789,706 an angular drive is known, which includes a socket for connection with a drive unit which can be mounted on a receiving stud of the drive unit and can be locked in any angular position on the receiving stud using locking screws which are radially arranged.

With such a device changing the angular position of the angular drive with respect to the drive unit is possible but complicated and time consuming, since the locking screws have to be released first and tightened again after changing the angular position of the angular drive.

It is therefore an object of the invention to create a retaining device for an angular drive of the afore-mentioned kind that allows easy and simple adjustment of the angular position of the angled drive with respect to the drive unit.

According to the current invention, this object is achieved by providing a socket for receiving the angular drive, a receiving connector for receiving the socket which is mounted pivotably on said receiving connector, which is rigidly connected to the drive unit, by providing locking means between the receiving connector and the socket for locking the socket against rotation on the receiving connector in fixed angular positions, wherein the locking means includes a plurality of ball elements, and by providing an actuation ring being engagingly connected to the ball elements of the locking means to actuate the ball elements for moving between a locking position in which the socket is locked on the receiving means against rotation and between a releasing position in which the socket is released for rotation on the receiving means.

With this arrangement a simple adjustment of the angular drive is possible by actuation the actuation ring. The latter can be arranged in such a manner that changing of the angular position of the angular drive with respect to the drive unit is possible by using only a single hand of the operator.

A very simple design is achieved if the ball elements are arranged displaceably in longitudinal grooves provided on the receiving connector and if the locking means further includes locking pins engaging the ball elements and being displaceable axially for locking or releasing the ball elements.

Thereby, the actuation ring has to be simply displaced axially to enable a locking or releasing of the locking means.

The actuation ring is preferably impinged by compression spring elements into a locking position for locking the angular drive in a predetermined position. Preferably the locking pins are impinged by helical springs, which are arranged axially and through which the locking pins pass axially. Further, if the locking pins are impinged into a direction opposite the drive unit, the retaining device can be handled in a very simple manner since withdrawing of the actuation ring is a common movement adapted to the natural course of motion of a person using the device.

A desired number of preset angular positions can be achieved by varying the number of axially extending grooves. The fact that the ball elements snap into the radially extending grooves means that the preset angular positions are reliably maintained, and that the structure is maintenance-free.

In a preferred embodiment, the balls are held in a radially displaceable manner in radial bores of the socket, and are advantageously protected against loss by an O-ring.

If the actuation ring is pulled back in the direction towards the drive unit, the pins then move relative to the socket in which the balls are held. The balls are then no longer retained, and they can move outwardly within their radial bores in the socket, if the socket is rotated in its angular position relative to the receiving connector. As soon as the balls engage in the adjacent longitudinally extending grooves, as a result of which the O-ring applies a certain radial force to them, they are retained in this position by the pins when the actuation ring is released. The spring action of the pins in the direction towards the angled drive thus ensures secure retention in the selected angular position.

Although the diameter of the socket of course can easily be adapted to different sizes of angled drives, in a further advantageous embodiment an adapter that can be threaded onto the socket on the drive side and onto the angled head on the angled drive side, is provided. When this kind of adapter is used, it is thus also possible to retain angled drives with considerably smaller diameters in a preselected angular position using the same retaining device on the receiving connector of the drive unit.

In a further advantageous embodiment, a stub shaft that is driven by the drive unit, and whose end is configured as a coupling into which the angled drive can be inserted for a positive-fit connection, is arranged coaxially within the receiving connector. This results in a simple, positive-fit power transfer system with which a variety of screwdriver or drill inserts can be inserted.

The invention is described in more detail below with reference to an especially preferred exemplary embodiment that is depicted in the drawings, in which:

FIG. 1a shows a schematic view of a retaining device that fits onto the central drive unit according to FIG. 1;

FIG. 1b shows a schematic view of an angled drive that can be used in conjunction with the retaining device according to FIG. 1a;

FIG. 1c shows a schematic view of a smaller-diameter angled drive with an associated adapter;

Figure 1:
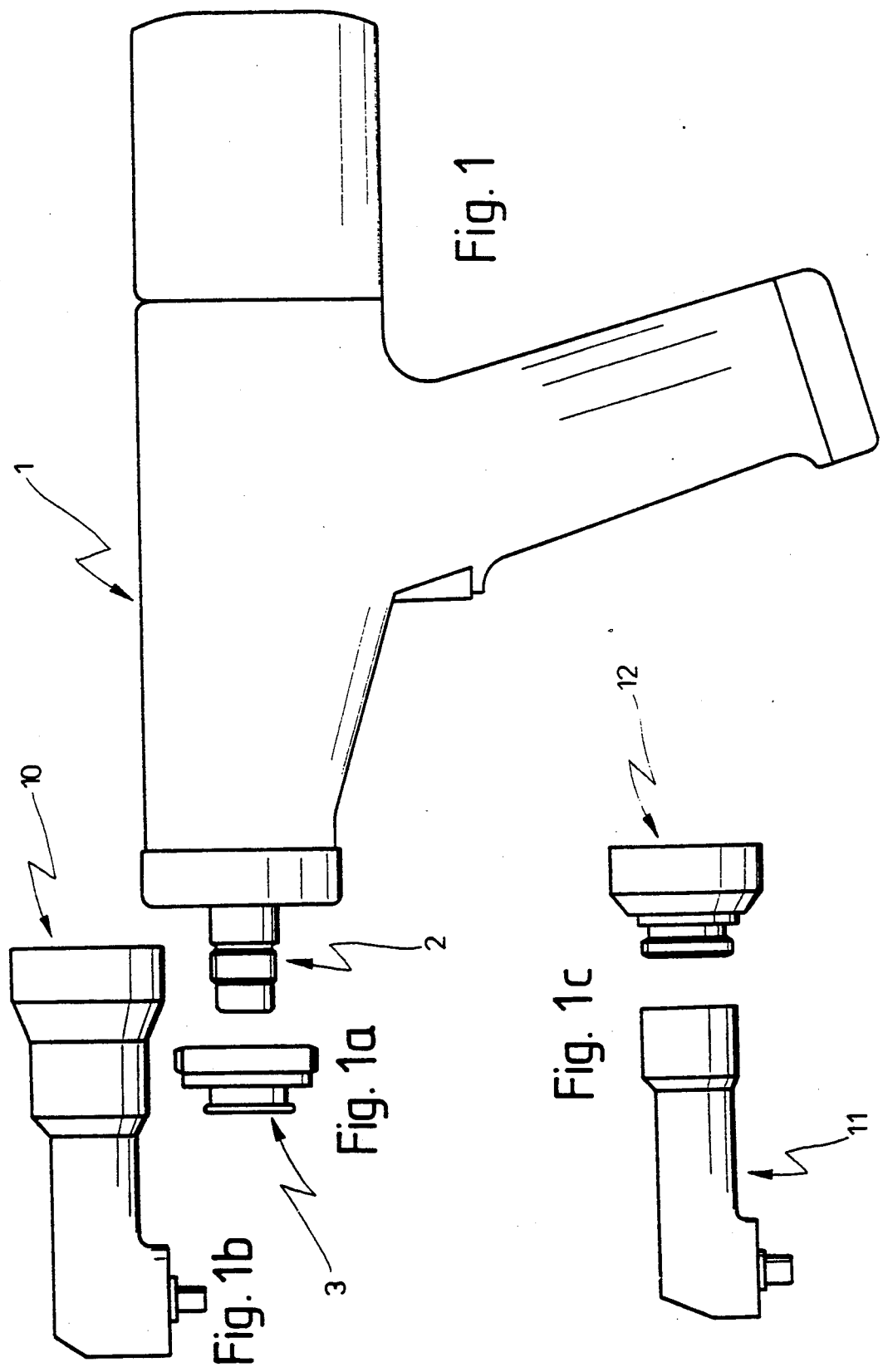
FIG. 1 shows a schematic view of a conventional central drive unit to receive a retaining device according to the invention.

FIG. 1 shows a conventional pistol-shaped central drive unit 1 from the front of which projects a receiving connector 2, within which a driven stub shaft is provided. A retaining device according to the invention, which is designated overall by numeral 3 and is depicted schematically in FIG. 1a, can be threaded onto the receiving connector 2. The retaining device according to FIG. 1a has external threads for threaded connection to an angled drive 10 as shown in FIG. 1b. If smaller angled drives 11 are to be used, an adapter 12 according to FIG. 1c, which has a suitable threaded section for receiving the angled drive 11, is first threaded onto the external threads of the retaining device 3.

Figure 2:
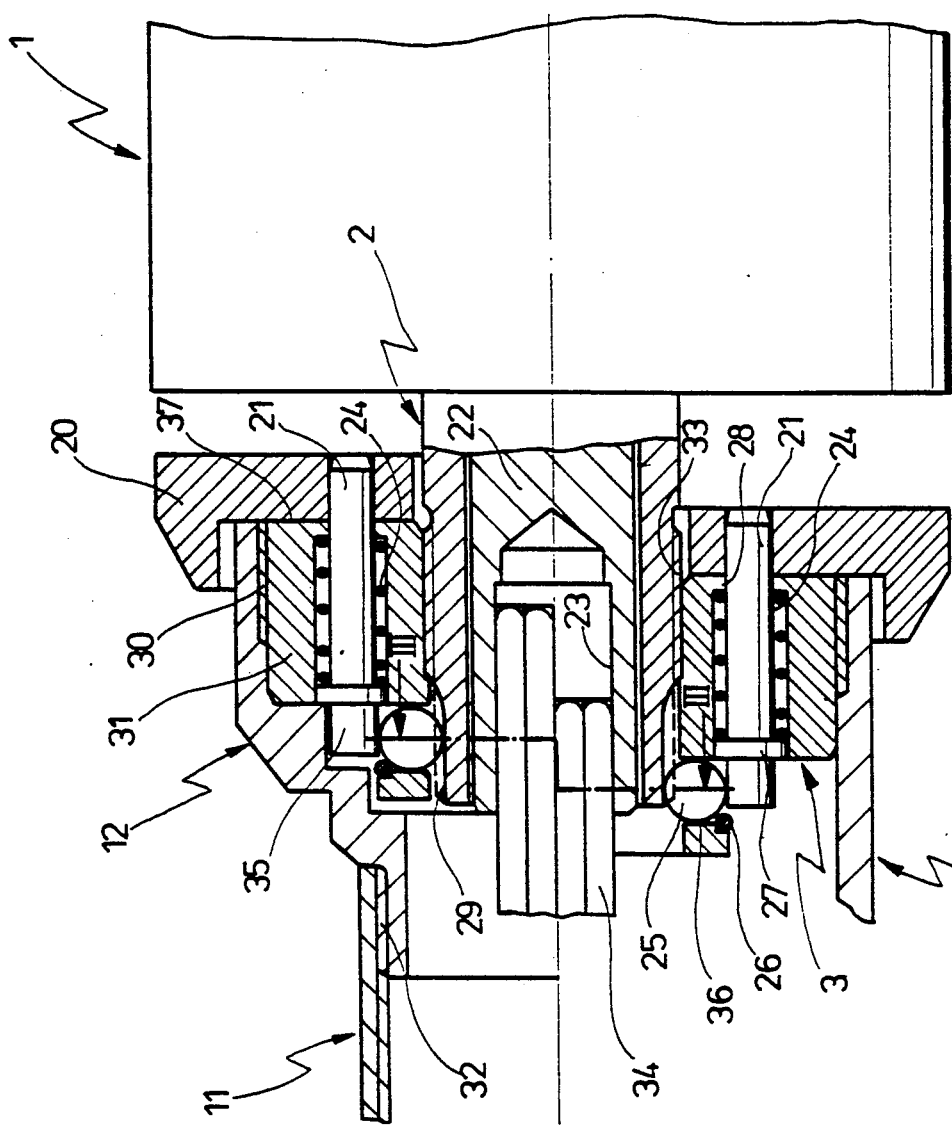
FIG. 2 shows an axial section of the retaining device of FIG. 1a, with the angled drive attachment and adapter according to FIG. 1c in the top half, and the angled drive attachment according to FIG. 1b in the bottom half.
Figure 3:
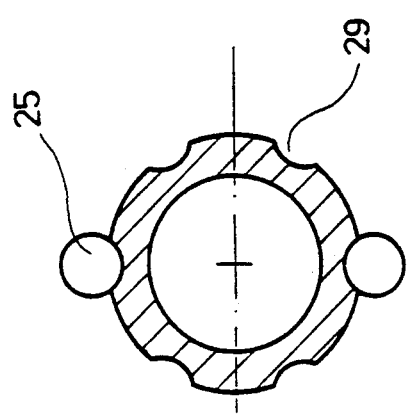
FIG. 3 shows a partial section along line III—III in FIG. 2, in which only the cross section of the receiving connector and the associated balls are depicted.

The construction of the retaining device is evident in detail from FIGS. 2 and 3. The receiving connector 2, which projects outwardly from the housing of the drive unit 1, has in its center region an externally threaded section 33 onto which an annular socket 31 can be threaded. In addition, a total of six axially extending grooves 29, which begin at the free end of the receiving connector and taper off to the outside after approximately one-third of the receiving connector 2, extend within the peripheral surface of the receiving connector 2. A ball 25, which can move radially in a radial bore 36 of the socket 31, is held in each groove 29. The balls are prevented from falling out by an O-ring 26. Also associated with the balls 25 are pins 21 which can be displaced axially in the socket 31, which, by means of their ends 35 on the angled head side, secure the balls 25 in the retained position depicted in FIG. 2, and thus, by means of the balls 25 and the grooves 29, ensure that the socket 31 snaps into a defined angular position with respect to the receiving connector 2.

The drive-side end surface 37 of the socket 31 is in contact with an actuation ring 20 into which the pins 21 project and to which they are rigidly attached.

In addition, a helical spring 24 that is braced at the angled-head end against a collar 27 of the pin 21 and at its drive end contacts an annular shoulder 28 of the socket, is arranged on each pin 21. The springs 24 thus result in spring action on the actuation ring 20 in the direction of the socket 31, so that the actuation ring is normally in contact with the radial end surface 37 of the socket 31 and can be pulled, against the spring pressure, back towards the drive unit.

When the actuation ring 20 is pulled back, the pin ends 35 release the balls 25, so that the latter are then secured on the outside only by the O-ring 26. If the socket 31 is then rotated on the threads 33 of the receiving connector 2, the balls 25 then slide laterally out of the axially extending grooves 29 until they engage in the adjacent longitudinal grooves and, when the actuation ring 20 is released, are again secured by the pin ends 35. The number of snap positions of the socket 31 on the receiving connector is defined by the number of grooves 29—six, in the exemplary embodiment shown. Of course a greater or lesser number can also be provided. For example, if the receiving connector has twelve grooves, the socket can then in each case be rotated and snapped into place through an angle of 30° or a multiple thereof. With a greater number of grooves, a ball with pin and spring need not be associated with each groove, in order to keep the design simple. As a rule, three balls with associated pins and springs, each arranged 120° apart from one another around the socket, are sufficient.

An externally threaded section 30, onto which an angled drive 10 can be threaded, is provided on the socket 31, as depicted in the bottom half of FIG. 2.

If a smaller-diameter angled drive 11 is to be used, the adapter 12 that is threaded onto the externally threaded section 30 of the socket 31 is then used to adapt it. On the angled drive side, the adapter 12 tapers to the desired diameter and is provided with suitable external threads 32 onto which the angled drive 11 can be threaded.

The stub shaft 22 arranged inside the receiving connector 2 is provided in order to drive the angled drive 10 or 11. The end of the stub shaft 22 is configured as a coupling 23 into which the shaft drive 34 can be inserted for a positive-fit attachment.

I claim:

1. Retaining device for an angled drive which is releasably connected to a central drive unit, said retaining device comprising:

a socket for receiving said angled drive;

a receiving connector for receiving said socket which is rotatably mounted on said receiving connector, said receiving connector being rigidly connected to said central drive unit;

locking means provided between said receiving connector and said socket for locking said socket against rotation on said receiving connector in fixed angular positions, said locking means including a plurality of ball elements; and an actuation ring being engagingly connected to said ball elements of said locking means to actuate said ball elements for moving said ball elements between a locking position in which said socket is locked on said receiving means against rotation and between a releasing position in which said socket is released for rotation on said receiving means.

2. Retaining device according to claim 1, wherein grooves are provided on said receiving connector, said grooves extending in axial direction of said receiving connector, wherein said ball elements are movable axially along said grooves.

3. Retaining device according to claim 2, wherein said locking means further includes locking pins engaging said ball elements, said locking pins being diplaceable axially for locking or releasing said ball elements.

4. Retaining device according to claim 3, wherein said acuation ring is displaceable in an axial direction and is rigidly connected to said locking pins.

5. Retaining device according to claim 1, wherein said actuation ring is impinged axially by elastic means into said locking position for locking said socket against rotation on said receiving connector.

6. Retaining device according to claim 4, wherein radially extending bores are provided on said socket, and wherein said ball elements are radially displaceable in said radially extending bores.

7. Retaining device according to claim 6 wherein said grooves are arranged on a peripheral surface of said receiving connector, and wherein said locking pins are impinged by compression spring elements into said locking position into a direction opposite said central drive unit.

8. Retaining device according to 7, wherein said compression springs are configured as helical springs which are arranged axially and through which said locking pins pass axially, wherein a collar is provided on each of said locking pins, wherein said socket has a drive-side end facing said drive unit and annular shoulders are provided for each said helical spring on said drive-side end of said socket, and wherein said helical springs are enclosed axially between said collars and said annular shoulders.

9. Retaining device according to claim 1, wherein threads are provided on said socket for screw-connection with said angled drive.

10. Retaining device according to claim 1, wherein an adapter is provided for receiving a small-diameter angled drive, said adapter being adapted for screwing onto said threads of said socket and being provided with an axially protruding section for receiving said small-diameter angled drive.

11. Retaining device according to claim 2, wherein said actuation ring is impinged axially by elastic means into said locking position for locking said socket against rotation on said receiving connector.

12. Retaining device according to claim 3, wherein said actuation ring is impinged axially by elastic means into said locking position for locking said socket against rotation on said receiving connector.

13. Retaining device according to claim 4, wherein said actuation ring is impinged axially by elastic means into said locking position for locking said socket against rotation on said receiving connector.

* * * * *